June 30, 1942.  T. B. HAWKES  2,287,800
INTERMITTENT DRIVE MECHANISM
Filed June 13, 1940 4 Sheets-Sheet 1

INVENTOR:
T. B. Hawkes
BY
Morrison, Kennedy & Campbell
ATTORNEYS.

June 30, 1942. T. B. HAWKES 2,287,800
INTERMITTENT DRIVE MECHANISM
Filed June 13, 1940 4 Sheets-Sheet 2

INVENTOR:
T. B. Hawkes
BY
Morrison, Kennedy & Campbell
ATTORNEYS.

June 30, 1942.  T. B. HAWKES  2,287,800
INTERMITTENT DRIVE MECHANISM
Filed June 13, 1940  4 Sheets-Sheet 3

INVENTOR:
T. B. Hawkes
BY Morrison, Kennedy & Campbell
ATTORNEYS.

Patented June 30, 1942

2,287,800

UNITED STATES PATENT OFFICE 2,287,800

INTERMITTENT DRIVE MECHANISM

Thomas Blair Hawkes, Champlain, N. Y., assignor of one-half to The Sheridan Iron Works, a corporation of New York, and one-half to T. W. & C. B. Sheridan Company, a corporation of New York Application June 13, 1940, Serial No. 340,272

6 Claims. (Cl. 74—436)

This invention is a novel intermittent drive mechanism, adapted to use between driving and driven shafts or other rotors. The principles thereof are illustrated as embodied in a construction and having an operation adapted for an automatic press feed, such as feeding successive blanks or sheet material into a platen press, with a pause for each press operation, and with advancing movements between operations; although the principles of the invention may be useful for analogous and other purposes.

A typical use for the present invention is to feed successive sections or separate pieces or sheets, as of leather or cardboard, in a manner to bring them one at a time between the platens of a press, and hold each section or piece of work stationarily there during cutting, punching, creasing, embossing or other press operation, followed by resumed advance or outfeed to a suitable place of delivery while the next section or blank is infed to position. The mechanism hereof is adaptable to use for various kinds and types of presses and to handle various materials therefor.

An example of a power press to which the present invention has been applied to substantial practical advantage is a marketed press of T. W. & C. B. Sheridan Company known as the No. 37 Toggle Cutting-Out Press, constructed for producing cut shapes out of cardboard, panelboard, wallboard or the like, suitable for various commercial or manufacturing uses and purposes. In such press the feed is usually from a supply or stacked source of sheets, and these are fed singly into the press by a work-feeding conveyor, comprising spaced-apart feed chains, connected by crossbars which carry grippers operated to engage and pull each sheet from the stack or supply into position between the platens and subsequently therefrom to the delivery, the conveyor chains passing around sprocket wheels and the drive mechanism serving to rotate these wheels intermittently in advancing direction. The principles can be applied to other than chain feed.

The nearest known prior drive mechanism adapted for press feeding uses is that shown in Bredenberg Patent No. 1,784,721, granted December 9, 1930, which comprises a particular combination of an elliptical gearing actuating with fast and slow rotation the driving shaft of a Geneva stop motion, consisting of the conventional crank member and four-point star member, the latter connected to drive intermittently the sprocket wheels and feed chains accordingly, with four feed strokes to one turn of the driven star member. An inherent drawback of the Geneva motion is the excessive period of time, or percentage of each cycle, consumed in the dwell or inactive portion of its operation between drives. In the case of a cutting-out press, where only a short period of time is required for the pause during pressing operation, this means a serious loss of output due to the relatively long period of pause brought about, complementary to the necessary minimum period required for the active or feeding portion of the cycle. In said patent the elliptical gearing was so combined in train with and in advance of the Geneva motion as to prolong somewhat the active or feeding portion of the cycle, and shorten the period of dwell, thus to improve the smoothness of transmission and permit some speeding up for increased output.

The present invention is usefully applicable not only on toggle-operated cutting-out presses, but on presses otherwise operated and for other purposes, and using chain feed, web feed or other types of feed for the material to be pressed. Presses of the sliding plate or reciprocating platen type, or employing movable inking devices, can be fed in accordance with this invention.

With the present invention the object and plan is to provide a smooth intermittent operation by means of a transmitting action in which there is ample dwell or pause for the pressing part of each cycle, but wherein the cycle of actions is reformed so that the feeding or advancing action may occupy a relatively much enlarged portion of the total cycle, consistent with the length of the feed stroke, so that the optimum duration is provided for each part of the cycle, and there is a minimum of time wasted, thus giving a maximum rate of output, all without sacrificing the smooth quietness of action or substantially harmonic movement, which is important both for durability of mechanism and accuracy of performance. A particular object is to afford in a smooth manner a variable speed of actuation of the driven shaft during the feed such that its average speed is relatively higher than is smoothly obtainable with a Geneva motion, for example as used in said prior patent, thus to shorten the actual time necessary for each feeding motion and so permitting to be increased the number of pressings per minute. A further object is to provide a high angular speed in the drive or feed shaft during the middle of its motion with smooth and harmonic actions of acceleration and deceleration leading to and from the same.

An important object is to afford principles of operation such that the relative timing can be adjusted to almost any practical requirement; by the construction to be described the dwell part of each cycle can be prolonged relatively to the drive or feed portion, and vice versa, to substantially any extent.

Further objects and advantages of the present invention will be made to appear in the hereinafter following description of an illustrative embodiment thereof. To the attainment of such objects and advantages the present invention consists in the novel intermittent drive mechanism and the novel features of combination, subcombination, operation, arrangement and construction herein illustrated or described.

In the accompanying drawings, Fig. 1, on a small scale, is an exterior view that may be considered a front elevation of a drive mechanism embodying the present invention shown enclosed in a protecting housing, but with certain principal parts indicated in dotted lines.

Fig. 9 is a front view showing a modified form of the locking member or rim on the driving shaft.

Fig. 10 is a detached rear elevation view, and Fig. 11 a left elevation view, of one of the important intermittently rotating members detached from the remainder of the mechanism.

Fig. 12 is a partial rear elevation view showing certain parts that are shown in front elevation in Fig. 4, taken partly in section on the line 12—12 of Fig. 3.

Figs. 13 and 14 are motion diagrams.

In the mechanism illustrated in the drawings, suitably mounted at the top end of a fixed standard 14, is a housing 15 for the drive mechanism, which may be elevated to be adjacent to the work supply and press platens. The housing may have a removable front cover plate 16, just within which is shown a bearing wall or plate 17; and a removable back cover or wall 18 also carrying a bearing; another bearing being carried on a fixed interior wall 19 disposed vertically through the housing, all as will be further described.

The drawings show four shafts in train, and these and their bearings will now be named and described. What will be termed the power shaft 20, extending horizontally from an exterior to an interior point, turns in bearings 21 and 22 in the lower part of the casing, power being understood to be applied by a high speed motor or otherwise to the exterior end of this shaft. It may be considered as disposed longitudinally.

The driving shaft 24 extends horizontally in a fore-and-aft or transverse direction between a front bearing 25 at the plate 17 and a rear bearing 26 at the rear housing wall. The drive shaft 24 may be considered as the primary shaft of the transmission, being turned relatively slowly through a speed reduction gear from the power shaft, this gear being shown in the form of a worm 28 on shaft 20 meshing with a worm wheel 29 on the shaft 24. Preferably shafts 20 and 24 turn continuously at constant speed, all variations being introduced beyond shaft 24.

The next shaft in order will be termed for convenience the intermediate shaft 32, being the first intermittently turned shaft beyond the drive shaft 24. This transverse shaft 32 is parallel to shaft 24, and has its front bearing 33 at the front bearing plate 17 and its rear bearing 34 at the interior bearing plate 19.

In train beyond the shaft 32 is the driven shaft 36 of the mechanism, disposed parallel to the shafts 24 and 32, its front end turning in the bearing 37 in the rear cover plate 18, other suitable bearings beyond or back of the housing to be understood. This may be considered the final shaft of the drive mechanism, turning intermittently, and at variable speed, and delivering the desired rotation for the purposes in hand such as the operation of the automatic work feeding means of a press.

Figure 1:
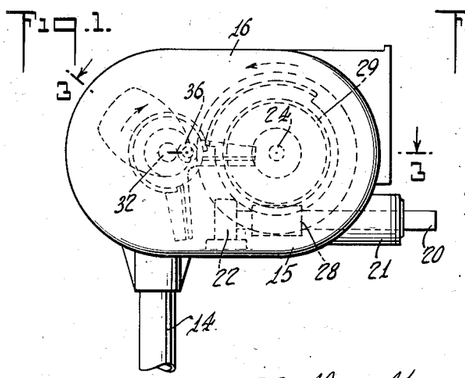
Figure 2:
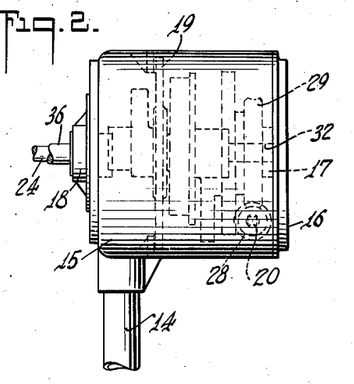
Fig. 2 is a left elevation of the mechanism shown in Fig. 1.
Figure 3:
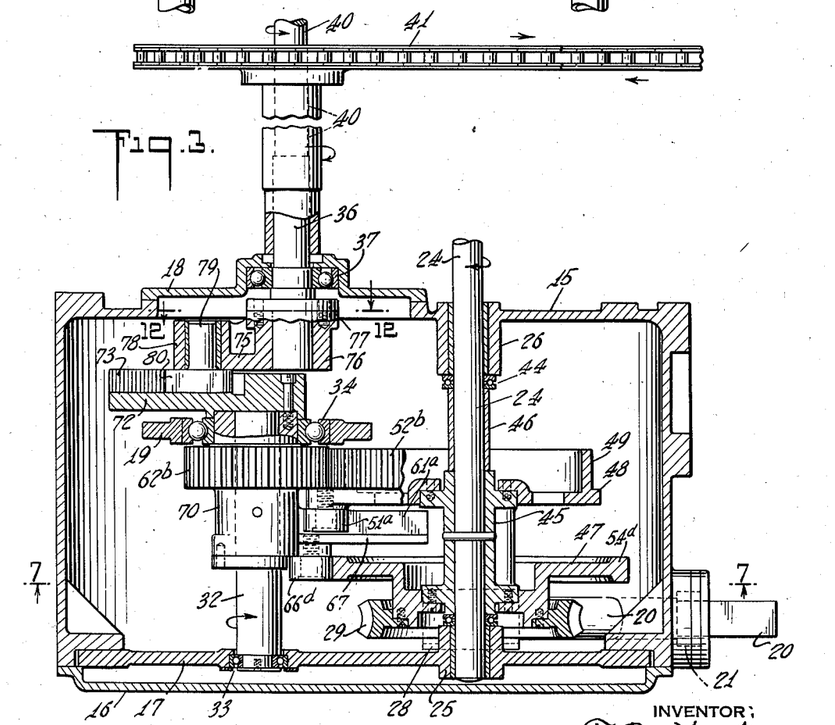
Fig. 3, on a larger scale, is a top plan view of the mechanism shown in Figs. 1 and 2 but with the top half of the casing omitted, the casing and certain other parts being shown in section taken on the crooked line 3—3 of Fig. 1.

The final or driven shaft 36 is shown as coupled to an extension shaft 40, this being indicated in Fig. 3 as the feed shaft of a press, carrying a sprocket wheel 41 driving a sprocket feed chain 42, and the shaft being indicated as extended further beyond, where it may carry a duplicate sprocket wheel with chain, the two chains cooperating to cause the infeed and outfeed, as by means of gripper cross bars of well known character. The sprocket wheels will be of proper size for the distance of each step of feed or travel of each section (blank or web) of the material to be acted upon in the press.

As an illustrative instance the lower press platen may be from 40 to 70 inches wide and the length of each step or stroke from 60 to 90 inches. Running at 40 press operations per minute, each cycle will be 1.5 seconds, during which the feed may use approximately .8 second, the pause .7 second, more or less.

According to one aspect or branch of the present invention there are special transmitting connections from the drive shaft 24 to the intermediate shaft 32 affording an advantageous intermittent rotation of the latter during continuous steady rotation of the former. According to another aspect of the invention there are fast-and-slow transmitting connections from the intermittent shaft 32 to the driven or final shaft 36 by which the intermittent motion of the former is converted to a more advantageous intermittent rotation of the latter. In its entirety the invention includes the cooperative combination of all of the connections between the drive shaft and the driven shaft; including the intermittent connections and the fast-and-slow connections, the latter preferably following the former. Although there is a special coordination and cooperation between the two portions of the complete mechanism, with a valuable resultant, it is convenient to describe separately the respective portions, with their actions, and thereafter their cooperation. Therefore next will be disclosed the preferred form of connections from the drive shaft 24 to the intermittent or intermediate shaft 32.

Preliminarily will be described the carrying parts mounted upon the uniformly rotating drive shaft 24. Between the front and rear bearings 25 and 26 are preferably thrust bearings 44, adjacent to the other bearings, and between the thrust bearings the following parts all rotating with the shaft. A flanged hub 45 is confined against the front bearings by means of a spacer sleeve 46 which abuts against the rear bearings. Upon the front end of the hub 45 is a front carrier disk or wheel 47, upon which in turn is mounted the worm wheel 29 already mentioned.

Upon the rear end of the hub 45 is a second carrier disk wheel or web 48 having a rear flange 49. All of these parts 45 to 49 are confined rigidly upon the shaft, being keyed, pinned or otherwise locked thereon to turn as a unit, and the front and rear disks or webs 47 and 48 carry the several transmitting members which take part in the intermittent drive.

As will be explained more fully upon the motion diagram the transmission from shaft 24 to shaft 32 involves, according to this invention, four successive stages or phases of action, marked $a$, $b$, $c$ and $d$ on the diagram, briefly describable as acceleration, fast gear drive, deceleration and pause or zero drive of shaft 32; and accordingly the two carrier disks or webs on the shaft 24 carry the four members to perform this sequence of transmitting actions upon corresponding members of the shaft 32 to be described. Preferably one complete turn of shaft 24 constitutes one cycle, and during such cycle the shafts 32 and 36 each make one complete turn.

Before describing these transmitting members in detail it should be mentioned that as illustrated in the drawings the entire drive mechanism is reversible in rotary direction, the various parts between shafts 24 and 32 being in effect symmetrically and equivalently arranged so that rotation in either direction of shaft 24 will afford intermittent rotation in the opposite direction of shaft 32; and similarly the connections from shaft 32 to the driven shaft 36 are symmetrically designed and arranged for transmission in either direction. However, for the sake of minimizing confusion in the description of the various parts and their actions it will hereinafter be assumed that the drive shaft 24 is to be turned counterclockwise in Figs. 1, 4, 6 and 7, the parallel shafts 32 and 36 consequently turning clockwise. Further, in describing the immediate coacting members interposed between shafts 24 and 32, for producing the four stages or transmitting motions $a$, $b$, $c$ and $d$ of each cycle, these letters will be applied as exponents upon the corresponding members.

With this understanding the following are the active members carried on the disks of the shaft 24 to bring about the successive driving motions through the cooperating members on the shaft 32. On the shaft disk or web 48 is carried a first pin $51^a$, this preferably including a roller, and being cooperable during stage $a$ to thrust or bear upon a projecting arm, lever or substantially radial spoke $61^a$ on the shaft 32. The member $51^a$ is in the nature of a crank pin mounted by web 48 on shaft 24 and delivering a driving thrust upon the member $61^a$. These members cooperate in such manner, by the thrust of the pin upon the arm, as to start the shaft 32 into rotation and smoothly but rapidly accelerate the rotation to a predetermined maximum speed, while the shaft 24 turns at steady speed; which action may occupy about 35° of the cycle.

The second drive transmitting member on the shaft 24 is a toothed segment or mutilated gear $52^b$, mounted at the outer side of the flange 49 of the disk 48 and extending only for a portion of the circumference thereof, for example 127°. This segment during stage or period $b$ acts upon a small gear or pinion $62^b$ on the shaft 32 and thereby delivers to said shaft a positive fast rotation through 127° of the complete cycle, during which the shaft 32 undergoes the greater part of its rotary movement. The pitch diameters may be as 2 to 1 and the angular speeds therefore as 1 to 2. Since the pinion is active during less than a full rotation it as well as the gear may be abridged into a segment, or either of them. In mentioning particular angular extents or speeds these are merely illustrative and may be varied for different purposes.

The position at the transition point between stages $a$ and $b$ is illustrated in Figs. 1 to 5, the members $51^a$ and $61^a$ having completed the acceleration phase, and the segment $52^b$ having made engagement with the pinion $62^b$ to maintain the rotation of the shaft 32 at the accelerated speed, the parts being so proportioned that the second pair of members $52^b$ to $62^b$ picks up the transmission where the first pair $51^a$ to $61^a$ left off, maintaining a smooth but rapid continued rotation of the shaft 32 for about one-third of the complete cycle. While the gear and pinion might be eccentric or elliptical to vary the resultant this is not preferred because introducing complication. During this second stage the shaft 32 is turned clockwise from the position of Fig. 4 around through the position shown in full lines in Fig. 7 and through the position shown in dotted lines in Fig. 7, and somewhat beyond that.

This terminates stage $b$ and brings the action to the transition to the third stage $c$ of the action, the latter consisting of a smooth but rapid deceleration, substantially symmetrical to the acceleration $a$ on the diagram. For the third stage of action the shaft 24 carries on the disk 48 a second pin $53^c$, similar to the first pin $51^a$, but in this case operating behind a radial arm $63^c$ similar to the arm $61^a$ on the shaft 32. The pin $53^c$ resists the momentum, thus restraining and rapidly decelerating the rotation of the arm $63^c$ and shaft 32, bringing them to zero speed or stoppage, as indicated on the motion diagram.

For convenience of construction and illustration, although not at all essential to the principles of the invention, the complete cycle is shown divided into stages of approximately the following extents; a thrusting and accelerating period $a$ of 35°, a fast gear drive period $b$ of 127°, a deceleration period $c$ of 35° and a stopped or stationary period $d$ of 163°; followed by repetition. These angular periods of course are fractions of a complete 360° rotation of the driving shaft 24 and, this being steady, they represent the relative periods of time occupied by the four stages of action, respectively, of the intermittent shaft 32.

Figure 7:
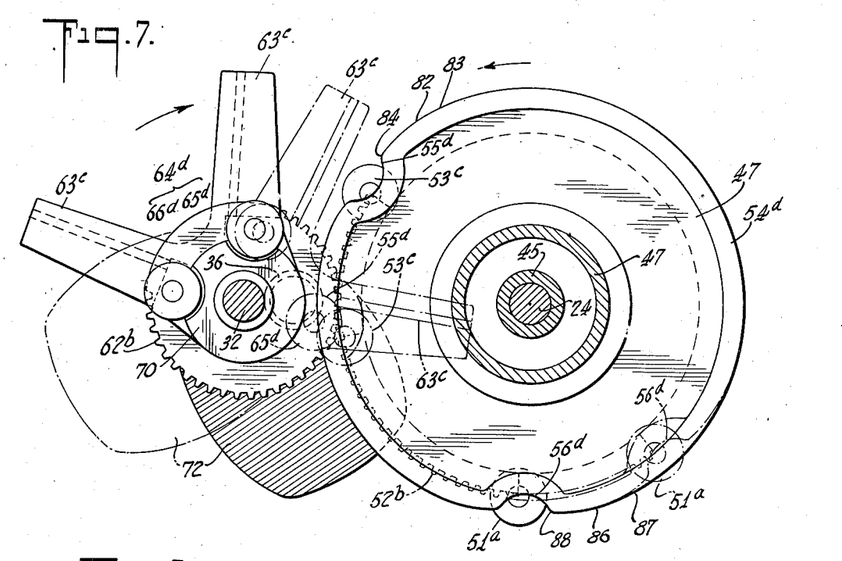
Figs. 7 and 8 are front elevation views corresponding in part with Fig. 4, but partly in section on the line 7—7 of Fig. 3 and showing the parts in different positions or stages of operation.
Figure 8:
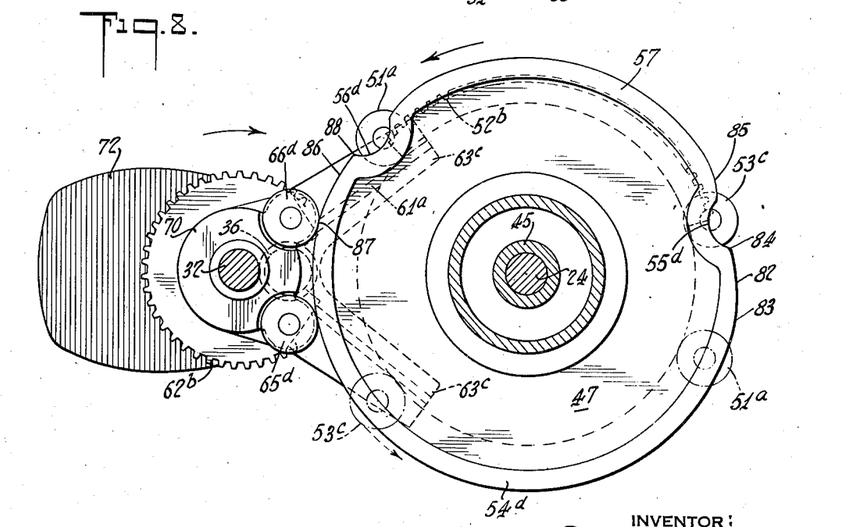
Figures 9, 10, 11, 12, 13:
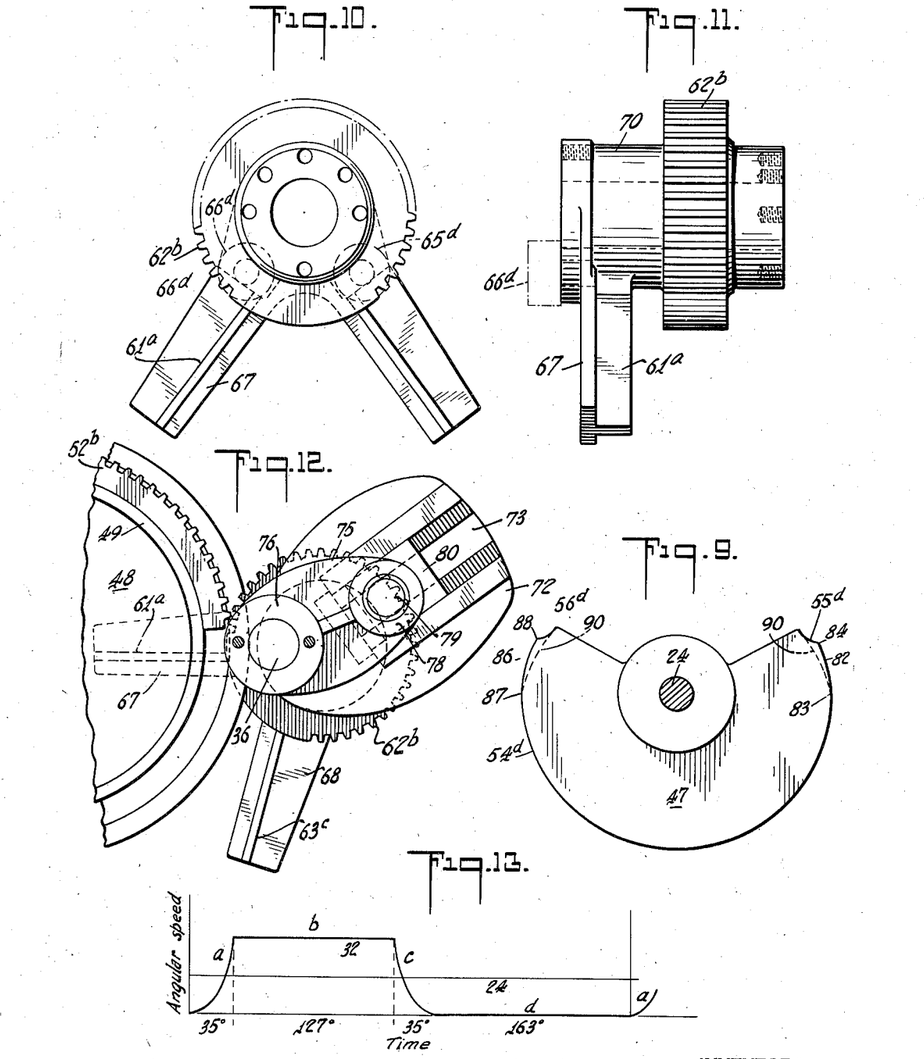

When the pin $53^c$ has retarded the arm $63^c$ progressively from maximum speed to zero, the parts have passed from the dotted position of Fig. 7 to a position at which the stopped stage of shaft 32 commences, to continue for about 163° of cycle. Fig. 8 shows the members on shaft 32 in this position, but with the shaft 24 turned considerably further and approaching the end of the complete cycle. The active drive shaft member during the zero stage comprises a locking arc-piece or rim $54^d$ on the disk 47 of the drive shaft. The locking arc $54^d$ of the rim commences near a first rim notch or pocket $55^d$ and terminates near a second notch $56^d$. The member $54^d$ effects its locking action by cooperation with a locking device $64^d$, comprising a twin pair of locking studs or contact pieces (each with roller) $65^d$ and $66^d$ mounted on the shaft 32, for example, one near each arm. The first notch $55^d$ and locking stud $65^d$ cooperate, the stud adapted at certain times to enter the notch; and the second notch and stud cooperate similarly. Between the notches at the other side of disk 47 is an idle rim portion 57, which could as well be omitted, as illustrated in Fig. 9.

The locking action of member 54ᵈ on member 64ᵈ is illustrated in Fig. 8, showing that the entire assemblage on shaft 32 stands symmetrical with the common plane of the axes of the two shafts, with the two studs contacting without appreciable clearance upon the rim 54ᵈ. The shaft 32 and carried parts necessarily remain stationary in this position until the advance of the arc-rim carries it beyond the second twin stud 66ᵈ, which can then drop from the rim into notch 56ᵈ, thereby releasing or unlocking the shaft 32 for repetition of cycle; the first drive pin 51ᵃ starting again into action against the first radial arm 61ᵃ to take up the rotation at the zero speed and accelerate it again to the maximum speed as first above described.

The coacting members 61ᵃ to 66ᵃ on the intermediate shaft 32 having been referred to, the entire assemblage on said shaft will now be described, with special reference to Figs. 3, 4, 5, 10 and 11. The radial arms 61ᵃ and 63ᶜ are shown as strengthened and stiffened by web plates 67 and 68 respectively, all of these parts being shown as projecting approximately radially from a hub 70 keyed upon the shaft 32. On an enlargement near the front end of the hub are mounted the two studs 65ᵈ and 66ᵈ, each including a roller. Behind the radial arms the hub has another enlargement upon which is mounted the pinion 62ᵇ, while upon the rear end of the hub is attached the inner race of the ball bearing 34, as shown in Fig. 3.

For description purposes the hub 45, with or without the driving shaft 24, may be considered as a driving rotor, while the hub 70, with or without its shaft 32, may be considered as a second or driven rotor; the two rotors having the described four sets of transmitting members for converting the continuous rotation of the first to the intermittent rotation of the second rotor.

There may here conveniently be described the fast-and-slow motion or connections, shown of the Whitworth type, between shafts 32 and 36. The shaft 32 itself is formed conveniently as a separate piece from the hub 70 which is bolted to it, and the hub is shown as carrying at its rear end a crank member 72 formed with a radial groove or way 73 and constituting the first of the two members or cranks of the fast-and-slow transmission device. The other member of this transmission device comprises a crank 75 the hub 76 of which is secured, as by bolted flanges 77, upon the driven shaft 36. The free end of the crank 75 is formed with an enlargement or head 78 in which is mounted a pin 79 extending forwardly into the way 73 of the cooperating crank 72.

These parts 72 to 79 constitute substantially what is known as a Whitworth drive motion, giving continuous fast and slow rotation of the driven part, and in accordance with the usual Whitworth motion preferably the pin 79 of the driven crank 75 can turn freely or swivel in the head 78, while the part of the pin that projects into the way 73 is enlarged into an oblong block 80. By this arrangement the crank 75 of this device, which has a fixed radius, cooperates variably with the other crank 72, which is of varying effective length as the block 80 slides inwardly and outwardly along the way 73 due to the eccentricity of the shafts 32 and 36 which carry the two cranks. As shown the ratio of the eccentricity or axis spacing to the fixed length of the radius 75 is as 9 to 22, so that the driving ratio from the crank 72 to the crank 75 will vary, during a complete rotation, between a maximum of 22 to 31 and a minimum of 22 to 13. Obviously the cranks 72 and 75 could be interchanged without altering their effect.

The driving effect of this Whitworth-type motion per se, assuming steady rotation of shaft 32, is indicated in the motion diagram Fig. 14, and this and the effect of it upon the intermittent drive will be discussed hereinbelow, after first however explaining in full the intermittent drive.

The mechanical parts having now been identified the principles of the invention and its practical operation may to advantage be further discussed.

So far as concerns the intermittent drive between the driving rotor, or shaft 24 with hub 45 thereon, and the parallel second rotor, or shaft 32 with hub 70 thereon, the mechanism may be outlined as comprising the following sets of connections cooperable in sequence through each cycle of transmitting action: (a) a first pin 51ᵃ on the driving rotor 45 and a first arm 61ᵃ on the second rotor 70, these cooperating through a short initial stage of operation during which the pin thrusts the arm and thereby causes starting and acceleration as the advancing pin approaches the common axial plane of the two rotors, and brings the second rotor up to a high angular speed well above that of the driving rotor; (b) a gear 52ᵇ on the driving rotor and a smaller pinion 62ᵇ on the second rotor cooperating through the second stage during which the gear drives the pinion at the high angular speed, at least one of these, the gear or pinion, or both, being so interrupted or abridged as to limit their meshing and gear drive to the second stage; (c) a second pin 53ᶜ on the driving rotor and a second arm 63ᶜ on the second rotor cooperating at the third stage during which the pin retards the arm and thereby causes deceleration of rotation as the pin recedes from such axial plane, and brings the second rotor to zero speed and stop; and (d) a concentric partial rim or interrupted arc 54ᵈ on the driving rotor and a pair 64ᵈ of studs or contacts 65ᵈ and 66ᵈ angularly spaced on the second rotor cooperating through the final stage during which the studs both bear upon the rim which thereby anchors the studs and locks the second rotor against rotation, this condition continuing until the locking rim advances beyond one of the studs, bringing the parts to the position of transition to the initial or acceleration stage; the entirety thus affording a smooth intermittent drive with an extended degree of fast rotation between pauses, well suited to the feed of automatic presses or similar uses.

Figure 4:
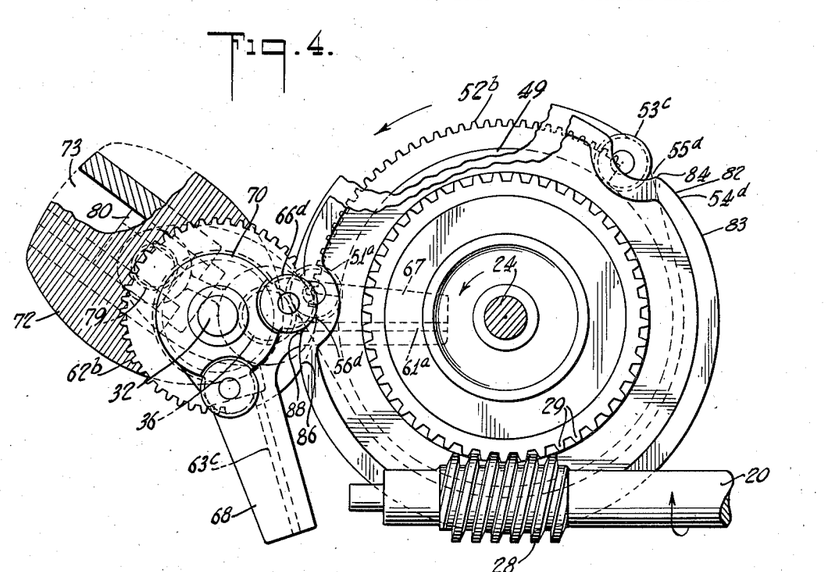
Fig. 4 is a front elevation view corresponding to Fig. 1, but on the same scale as Fig. 3 and with the casing and other fixed parts omitted.
Figures 5, 6:
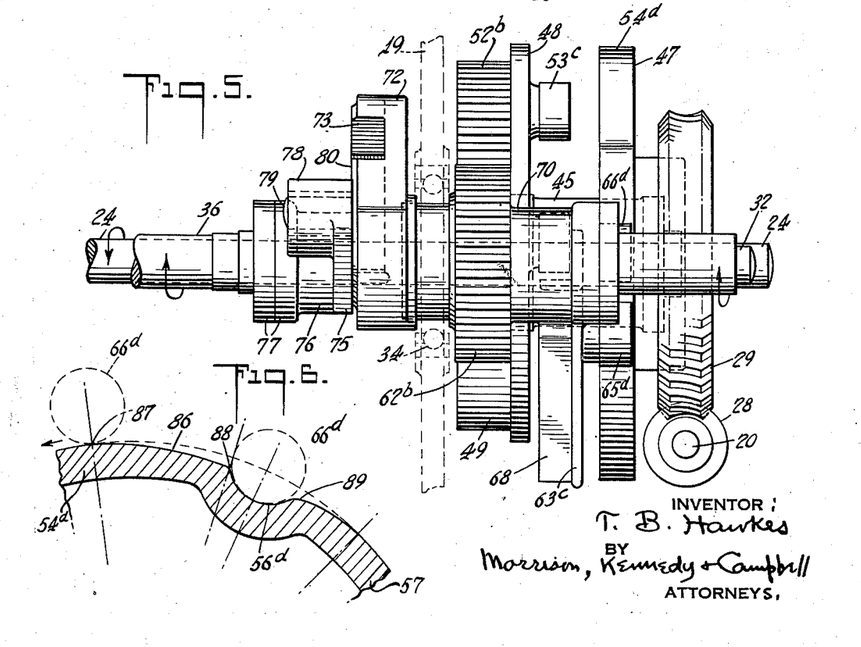
Fig. 5 similarly is a left elevation view corresponding to Fig. 2, but with the casing omitted.
Fig. 6 is an enlarged front view in detail of a portion of the locking rim member of Figs. 4, 7 and 8.

A special configuration of the locking rim 54ᵈ is desirable, as follows. The rim notches 55ᵈ and 56ᵈ are in the nature of pockets preferably deep enough to accommodate loosely the studs 65ᵈ and 66ᵈ, and preferably located to receive the studs near the transition points between acceleration and gear drive, and between gear drive and deceleration, respectively. Consequently, to permit this, an incline or bevel is formed at each end of the rim, beyond its true locking arc, as best disclosed on Fig. 6. Near the notch 55ᵈ, see Fig. 4, is the bevel or slant 82 extending between the true beginning point 83 of the concentric rim and the shoulder 84 where the bevel or upslant 82 meets the notch 55ᵈ. At the other end of the rim, similarly, a bevel or decline 86 starts at the true end of the rim 54ᵈ, marked by the point 87, see Fig. 6, and this downslant extends from said point 87 to the shoulder 88 at which the bevel meets the notch 56ᵈ. Beyond the notch 55ᵈ the idle rim may be beveled or cut away at 85, and the other notch 56ᵈ cut away at 89; these being unnecessary but only desirable when the idle rim portion 57 is retained.

The reason for providing the incline surfaces 82 and 86 beyond the concentric portion of the locking rim 54ᵈ is as follows, best explainable on Fig. 8. It is there seen that the pin 51ᵃ is about to commence its accelerating thrust upon the arm 61ᵃ. The rim 54ᵈ however continues to hold locked both of the studs 65ᵈ and 66ᵈ, so that the shaft 32 could not turn except by a special provision, and this provision is shown as the incline 86, along which the stud 66ᵈ may run, as the acceleration of the shaft 32 brings that stud below the circumference which is a continuation of the concentric rim, as indicated in dotted lines in Fig. 6. The concentric rim 54ᵈ has really terminated at the point 87, and from this point to the notch the rim becomes a cam, leading the stud 66ᵈ to the shoulder 88 which leads abruptly into a notch.

The action of the locking rim 54ᵈ therefore, to the extent of the incline 86, is accommodated to the accelerating action of the pin 51ᵃ upon the arm 61ᵃ. The same conditions and purposes are true also in respect to the stud 65ᵈ and notch 55ᵈ at the other side, although there the stud has to pass from the notch along the upslant 82 from the notch to the full diameter of the rim 54ᵈ.

The modifications of rim structure thus described afford also the advantage of a positive control of the driven rotor and its carried parts. Thus while the pin 51ᵃ for example runs along the face of the arm 61ᵃ giving a positive thrust on the driven rotor, at the same time the driven stud 66ᵈ swings down along the face of the decline 86, thus restraining any over-motion from the thrust of the pin. The exact shape of the incline 86 is preferably calculated, in relation to the shape of the arm 61ᵃ to give this result, the incline being shown curved and the arm straight, although obviously the arm could be somewhat curved, and the incline cooperatively shaped to afford a similar control of the driven rotor. By sacrificing the positive control, and admitting a certain freedom of play during acceleration and deceleration the inclines 82 and 86 would not need to be carefully plotted, and indeed might be replaced by a simple extended decline or cam surface from the point 83 or 87 directly to the deepest point of the notch 55ᵈ or 56ᵈ, as indicated by dotted lines at 90 in Fig. 9. The positive control however is superior in providing exact relationships and making certain that the teeth of gear 52ᵇ and pinion 62ᵇ will come into accurate mesh in each cycle as intended.

An illustrative cycle of operations, shown as taking place in one complete turn of the driving shaft 24, and as bringing about one complete turn of each of the shafts 32 and 36, may be described as follows, dealing first with the motions produced in the intermittent shaft 32, according to the motion diagram Fig. 13.

(a) Following each period of pause or dwell of shaft or rotor 32 or 70, the acceleration commences by reason of the first driven pin 51ᵃ running from the outer end inwardly along the first arm 61ᵃ, as shaft 24 turns counterclockwise. This not merely swings the arm and starts the shaft 32 into rotation, but accelerates them rapidly, due first, to the progressive shortening of the driven radius of the arm as the pin approaches the common axial plane or its position nearest to the shaft 32, and second, to the progressive relative change of direction of motion of the pin from substantially tangential to approximately a right angle to the length or contact face of the arm. The two arms 61ᵃ and 63ᶜ are shown diverging, forming a V-shape fork of about 90°, and each is preferably approximately radial, but with considerable latitude, of arrangement. The described acceleration, occupying about 35° of driving shaft rotation, brings the speed of shaft 32 from zero up to its maximum, this shaft during this period turning clockwise a fraction or somewhat over 45° of one rotation. The change of position is generally indicated by passing from the position of Fig. 8 to that of Fig. 4, the latter representing a transition point. During this acceleration the driven stud 66ᵈ travels along the inward slant 86 beyond the rim 54ᵈ, and thence into the notch 56ᵈ, while the other stud 65ᵈ swings out away from the rim.

(b) The acceleration is superseded by the gear drive, the large abridged gear or toothed segment 52ᵇ having now meshed with the pinion 62ᵇ, these taking up the driving action and giving a fast and preferably steady rotation to the shaft 32; the passing of the stud 66ᵈ into and from notch 56ᵈ avoiding any clash. This action may continue for about 127° of shaft 24 rotation, during which shaft 32 may turn the major part of its rotation, or somewhat under 270°, assuming the gear ratio of about 2 to 1. The drive passes smoothly from the acceleration to the gear drive, the two speeds being substantially equal, since it will be noted that the pitch line of the gears, Fig. 4, passes through the contact point of the pin 51ᵃ upon the arm 61ᵃ. During the transition both actions therefore are synchronous, so that the accurate meshing of the gears is readily ensured. Beyond the transition point however the arm is swung ahead relatively away from the pin. This gear drive brings about the greater part of a complete turn of the shaft 32, as stated, the parts passing from the Fig. 4 position through and beyond both positions shown in Fig. 7. Towards the end of this advance the first stud 65ᵈ on the shaft 32 is brought into loose engagement in the first notch or pocket 55ᵈ, which accommodates it but without any locking action. At the end of this stage the gear and pinion become unmeshed, because the teeth terminate on one or both, leaving the driven parts under high momentum, including that of the feed shaft 40, sprockets etc.

(c) Deceleration now takes place by the retarding action of the second pin 53ᶜ acting behind the second arm 63ᶜ, and resisting positively the existing momentum, as it has about commenced to do in the dotted position of Fig. 7. During about 35° of rotation of shaft 24 the pin thus progressively slows down the driven parts from the maximum speed to zero, thus smoothly and harmonically stopping the rotation of shaft 32. The final position of the pin is shown in dotted lines in Fig. 8. The deceleration could be otherwise effected, positively or otherwise, as by the aid of a friction brake applied in this stage, but the pin and arm plan is highly preferred. The final part of this stage brings the second stud 66ᵈ around into contact with the locking rim 54ᵈ, the first stud 65ᵈ having already long since swung out of its notch 55ᵈ and started up along the upslant 82. The deceleration stage ends with both studs bearing upon the rim.

(d) Thus begins the final or locked stage, the shaft 32 dwelling or pausing while some operation occurs, e. g. the press platens operate upon the work. The shaft and parts beyond are now kept at zero speed because during this period the two spaced studs or contact members, jointly constituting the locking device 64ᵈ, are both held positively in the position shown in Fig. 8. While the shaft 32 thus remains at rest the driving shaft continues its rotation, and the locking rim advances around in contact against the two studs, as shown in Fig. 8, through about 163°. At the end of this stage the second stud 66ᵈ passes the point 87 and rides off from the terminal end of the concentric locking rim or arc 54ᵈ so that it can swing inward and permit transition to stage (a), the first pin 51ᵃ having meanwhile come into contact upon the first arm 61ᵃ to repeat the acceleration stage as first above described.

In Fig. 13 the diagram gives an illustrative action. The horizontal line 24 above the base or time line represents the steady angular speed of driving shaft 24, let us say 240° per second. Curves (a) and (c) of the line 32 represent the symmetrical acceleration and deceleration stages of shaft 32, separated by the gear drive stage (b), while (d) represents its dwell or locked stage, all occurring in the one cycle between the two vertical lines. The gear drive being of ratio 1 to 2 the line (b) shows twice the speed of shaft 24, or 480° per second. The total area below lines a, b and c then represents by integration a complete or 360° turn of shaft 32, as does also the area below the horizontal line 24 represents a complete turn of shaft 24, these two areas being equal, and the horizontal line representing also the average angular speed of the shaft 32 for the entire cycle. The design is readily adaptable to various needs. By making the gear segment longer and the locking rim shorter the dwell can be relatively shortened and the drive or feed period lengthened. The arms and the rim can be reshaped to alter the transition between dwell and acceleration of deceleration.

Certain special aspects of the operative relation between the two driven studs and the two notches of the locking rim require supplemental explanation. It is first noted that while the notches are so termed for convenience, and are so illustrated, the essential portions thereof are the shoulders or corners near the two ends of the concentric rim 54ᵈ. These may be referred to as the first shoulder 84 near the initial end of the locking rim and the second shoulder 88 near the final end of the rim. Of these the former functions when shaft 24 turns counterclockwise as assumed, the latter being symmetrical and ready to function with opposite rotation of the shaft. The other sides of the two notches, and indeed the entire idle rim portion 57 between them might be wholly omitted without essential effect. The special function then of the shoulder 84 at the first notch 55ᵈ may be described as follows.

Each cycle has for convenience been considered as commencing with the start of the feed of each gripped piece of work, in other words with the acceleration stage (a). If, when power is discontinued and the press is stopped for any reason, the parts should chance to stop in the acceleration stage, there would obviously be no difficulty in restarting. The power would come on gradually, the pin 51ᵃ resuming its thrust upon the arm 61ᵃ. This stage of drive is positive, and so also is the gear drive of stage (b). At stage (c) however the deceleration is by the mere obstructing contact of the pin 53ᶜ against the arm 63ᶜ, the momentum of the shaft 32 and the parts beyond constituting the force which continues their advance. It is therefore obvious that if by chance the mechanism is stopped during the deceleration stage (c), the pin 53ᶜ can not pull or act upon the arm 63ᶜ for the resumption of drive, and the problem is how this stage is to be completed.

This apparent difficulty however is fully taken care of by the cooperation of the driving shoulder 84 with the first driven stud 65ᵈ, as will next be described. In a sense the engagement of the stud 65ᵈ in the notch 55ᵈ is like the engagement of a gear tooth within a gear space, or rather the engagement of a tooth on one gear with a tooth on a meshing gear, and in this sense the shoulder 84 performs the function of a driving tooth acting on the stud 65ᵈ as a driven tooth. At the start of the deceleration, as the gear and pinion unmesh, the stud 65ᵈ is accommodated loosely in the notch 55ᵈ, both being at this instant substantially in the axial plane. This position is not specifically represented in the drawings excepting reversely by considering Fig. 4 with the driving parts turning clockwise, the stud 66ᵈ engaged in notch 56ᵈ. During the deceleration the stud 65ᵈ gradually rides out of the notch 55ᵈ, as illustrated by the dotted position of Fig. 7, and normally it comes to the locking rim circumference as already described. But if the machine should chance to stop, after the gear and pinion have unmeshed, during the deceleration stage, then the stud 65ᵈ will stand shifted partway out of the notch, for example like said dotted position. As a matter of fact, in such condition, the driven parts may be slightly loose, there being no momentum, and the arm 63ᶜ can be swung freely through a short extent, limited by the contact of the arm upon the pin 53ᶜ and by the contact of the stud 65ᵈ upon the shoulder 84 which is at the side of the notch 55ᵈ. Now upon restarting the machine this shoulder 84 comes into action, acting like a tooth, overtaking the stud 65ᵈ and thrusting gradually against the stud, causing it and the driven parts to swing easily through the short additional rotation necessary to complete the deceleration stage, this action terminating as before by the riding up of the stud upon the peripheral rim 54ᵈ, so that by cooperation of the rim with the pair of studs the drive passes into the dwell stage (d) and normal operation follows.

Figure 14:
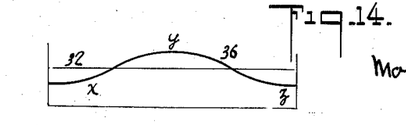

The diagram Fig. 13 representing then the character of the intermittent rotary movements of the intermediate shaft 32, the analogous diagram Fig. 14 shows the principles of the action of the motion between the shaft 32 and the final or feed shaft 36. Since the shafts 32 and 36 are in motion only during a portion of the complete cycle of the mechanism, the Fig. 14 diagram is abridged to the length of the active portion of Fig. 13. Moreover, for purposes of explanation, the shaft 32 is assumed as rotating at a constant speed, represented by the horizontal line 32 above the base or time line of the diagram, and this line may be considered as representing the average speed of the shafts 32 and 36. On this basis the curved line x—y—z represents in principle the rotary speed of the final or driven shaft 36 as produced by the Whitworth-type motion between the two shafts. The parts 72 to 80 inclusive involved in the fast-and-slow motion have been hereinbefore described. At the position shown in Fig. 3 the crank 72 is of minimum length so that, the crank 75 being of fixed length, the rotary speed of the shaft 36 will be at its minimum, and this is indicated at the left side of Fig. 14, at the beginning of the portion $x$ of the curve, the shaft 36 here rotating considerably slower than the shaft 32. When the two cranks come to an opposite position, then crank 72 will be of maximum length, and the shaft 36 will have maximum speed, represented at the peak of the portion $y$ of the curve. At some midway point, where the line $x$—$y$ crosses the line 32 the two cranks will be momentarily equal, and such a condition will prevail also where the curve $y$—$z$ crosses the line 32; beyond which the curve $z$ represents the relative slowing of the shaft 36 to its minimum speed. During these actions the swiveled block or slide 80 slides outwardly and inwardly within the slidway 73.

The Fig. 14 diagram then does not represent actual motions but shows the principle of the fast-and-slow mechanism between shafts 32 and 36, the latter rotating alternately slower and faster than the former. It will be noted that the peak of the faster motion on the curve $y$ is set to correspond with the central portion of the gear travel $b$ of the Fig. 13 diagram. The crank 72 is so positioned on shaft 36 as to give this timing. The combined effect of the two motions therefore, at this moment, would be a substantially enhanced midway speed of the driven shaft. If curve $y$ in Fig. 14 be 40% faster than the line 32, then the final shaft at this moment will have a speed 40% faster than the maximum or gear driven speed of stage ($b$).

By calculation it would be possible to superimpose upon Fig. 13 a speed curve representing the resultant actual motions of the driven shaft 36, but this seems to be unnecessary for a description of the principles involved, and has not been attempted. It is manifest however that in its entirety the effect of superimposing the motion indicated in Fig. 14 upon that of Fig. 13 would be such as to give a more smooth and easy starting or acceleration of the driven shaft 36 and the heavy feed parts actuated by it, and similarly an easier deceleration and stopping. This is because the acceleration curve $a$ when modified by the synchronous slow phase $x$ of the Whitworth curve is yet more gradual and shockless; and the same is true of the effect of the slow phase curve $z$ upon the deceleration curve $c$. This advantage moreover is attained without any sacrifice in the total extent of rotation of shaft 36 and feed sprockets 41, which still make one complete turn in each cycle. The slight loss in travel resulting from the easing of the acceleration and deceleration is made up by the elevating of the maximum speed, during the middle portion of the feed movement, above that represented by the gear drive stage ($b$), all without impairing the smoothness of the total feed movement.

Therefore the cooperation, in train, of the mechanism between shafts 24 and 32, and that between shafts 32 and 36, affords a more highly advantageous final resultant motion, adapted to be delivered to the feed devices, rendering their starting, traveling and stopping so easy and harmonic as to make it practical to speed up relatively the entire mechanism, to the improvement of output of the press.

As designed, the feed sprocket wheel 41 makes one turn per cycle and therefore the length of the circumference of the sprocket wheel is representative of the length of each feed stroke, for example from 60 to 90 inches, and the sprocket wheel therefore will be selected in accordance with the size and arrangement of the press. In one type of press the successive sheets of material instead of being stacked are set manually against positioning gages or stops, in position to be gripped or grabbed by the feed devices and pulled advancingly to the indicated length of feed stroke, thereby to be received, whether in one or more feed steps, above the under platen of the press, the succeeding pause of travel permitting the quick press action desired, following which the resumed feed carries outwardly the pressed sheet and carries inwardly the next sheet for the next press operation.

Reviewing the aspect of the full combination of an intermittent drive motion with action on the principles of Fig. 13 and a fast-and-slow motion with principles like Fig. 14, the invention may be stated as embodying an intermittent drive means between the parallel driving and intermediate shafts, the same comprising sets of coacting members constructed and arranged to act in sequence through each cycle of driving shaft rotation substantially as follows: first ($a$) to start and accelerate the intermediate shaft within a short extent of the cycle up to a high angular speed substantially above that of the driving shaft, then ($b$) to gear-drive the intermediate shaft at the high speed for a substantial extent of the cycle, then ($c$) to decelerate the intermediate shaft within a short extent of the cycle and bring it down to zero speed or stoppage, and then ($d$) to lock and hold in stopped position the intermediate shaft for the substantial balance of the cycle until its release for repetition of acceleration; said drive means cooperating with a harmonic fast-and-slow drive means (such as a Whitworth-type motion) arranged between the intermediate and driven shafts, and so connected with the intermediate shaft that approximately its faster phases correspond with the gear drive and its slower phases with the deceleration and acceleration rotation of the intermediate shaft; whereby there is transmitted to the driven shaft an intermittent rotation of which the rotation period is an extensive portion of the entire cycle and consists of a high angular speed occurring between smooth and harmonic acceleration and deceleration.

This combination drive mechanism is believed to be novel in the combined functional operation thereof involving, first, an intermittent drive mechanism between the driving and intermediate rotors of a kind to transmit in each cycle, between dwells, a stage of smooth acceleration followed by a substantial stage of fast drive and then deceleration; and, second, a continuous drive mechanism between the intermediate and driven rotors of a kind to transmit alternately faster and slower periods of rotation; said two mechanisms being so related or timed through their respective connections to the intermediate rotor that in each cycle the faster period of the second mechanism occurs during the fast drive stage of the first mechanism thereby to enhance the driven rotor speed during such stage, while the slower period of the second mechanism is apportioned to occur during the acceleration and deceleration stages respectively of the first mechanism thereby to decrease the rates of acceleration and deceleration of the driven rotor and thus smooth these actions preceding and following each period of enhanced speed.

If the described intermittent motion be so combined with a fast-and-slow motion that the latter precedes the former in train, the advantages of the invention can be obtained to some extent, especially when a final drive is desired having a quite short dwell and a prolonged feed period; in which case the peak of the high speed of the fast-and-slow motion should preferably coincide with the middle part of the fast or gear drive of the intermittent motion, as before, so that the combined high speeds will afford a super high-speed, while the acceleration and deceleration are relatively eased, and the dwell afforded by the intermittent motion is somewhat prolonged by the slow phase of the first motion. However, the construction as disclosed on the drawings is superior both in design and operation, while the slow phases of the fast-and-slow motion are more advantageously coordinated with the acceleration and deceleration stages of the intermittent motion.

The universal adaptability of this invention for arranging the drive and dwell portions of the cycle to the practical needs has been mentioned. This enables the cycle to be fully occupied by the drive or feed and by the dwell, and so avoids loss of time and affords increased output. To reduce relatively the dwell it is only necessary to shorten the locking rim 54$^d$ of the intermittent motion, and lengthen the driving gear or pinion, that is, redesign them for the use in hand. During drive or feed the cycle can readily be apportioned between acceleration, gear drive and deceleration. The acceleration period can be altered by varying the design of the arm 61$^a$, its shape or angle; or by changing the position of the driving pin 51$^a$, either radially or circumferentially or both. Instead of the timing indicated for this motion it has ben successfully employed to afford acceleration and deceleration of 53° each, fast drive of 127° and dwell of 127°.

An intermittent drive mechanism has thus been described which embodies the principles and attains the objects of the present invention; and since various matters of combination, subcombination, operation, arrangement and construction may be modified without departing from the principles involved, it is not intended to limit the invention to such matters except to the extent set forth in the appended claims.

What is claimed is:

1. A combination drive mechanism adapted to the uses described, having an intermediate rotor between driving and driven rotors, and comprising in combination, first, an intermittent drive mechanism between the driving and intermediate rotors of a kind having sector gearing to transmit in each cycle, between dwells, a substantial stage of fast drive with smooth acceleration and deceleration between dwells and gear drive, and, second, a continuous drive mechanism between the intermediate and driven rotors of a kind affording alternately faster and slower periods of rotation; said two mechanisms having coordinated connections to the intermediate rotor whereby in each cycle the faster period of the second mechanism occurs during the fast drive stage of the first mechanism thereby to enhance further the driven rotor speed during such fast stage, and whereby the slower period of the second mechanism is apportioned to occur during the acceleration and deceleration stages respectively of the first mechanism thereby to decrease the rates of acceleration and deceleration of the driven rotor and thus smooth these actions preceding and following each period of enhanced speed.

2. The combination as in claim 1 and wherein the driving rotor turns with uniform speed at one turn per cycle; the intermediate rotor turns also at one turn per cycle but intermittently with a prolonged stage of uniform gear drive between dwells at a speed faster than that of the driving rotor; and the driven rotor turns intermittently with twice enhanced speed between dwells.

3. The combination as in claim 1 and wherein the continuous drive mechanism between intermediate and driven rotors is disposed with its fast speed condition in effect during the driving of the intermediate rotor through its gear sector, whereby the high speed phases of the two mechanisms are mutually superimposed, affording multiplied smooth high speed of driven part rotation between dwells.

4. A combination drive mechanism adapted for the successive feeding of sheets from a supply to a stopped position in a press, with a long stroke between supply and press, comprising an intermittently advancing endless chain for operating the feed devices and the following actuating means: a driving shaft, an intermediate shaft, and a final shaft for actuating the chain; an intermittent drive motion between the driving and intermediate shafts of a type to deliver between dwells a prolonged stage of gear drive of the intermediate shaft faster than the driving shaft and with smooth speed changes between such gear drive stage and dwells; and between the so-driven intermediate shaft and the final shaft a continuous drive motion of a type to deliver alternately fast and slow varying speed; with said two drive motions connected respectively to the intermediate shaft in a relation such that the fast stage of the varying continuous drive motion coincides with the fast gear drive stage of the intermittent drive motion, thereby doubly enhancing the final shaft speed between the dwells.

5. A combination drive mechanism having between driving and driven shafts, a go-and-stop drive mechanism actuated directly by the driving shaft and of the type which operates to transmit in each cycle, between dwells, a stage of smooth acceleration followed by a substantial stage of fast uniform drive and then deceleration, and actuated by the go-and-stop mechanism a fast-and-slow drive mechanism of the type which operates to transmit continuously alternately faster and slower stages of rotation; said two mechanisms being interconnected by means so relating them that in each cycle the fast drive stage of the fast-and-slow mechanism occurs during the fast drive stage of the go-and-stop mechanism thereby to enhance the driven shaft speed during such stage.

6. A combination drive as in claim 5 and wherein is an intermediate rotor between the two mechanisms and the mechanisms are such that during a single continuous 360° turn of the driving shaft, the intermediate rotor and the driven shaft each make one 360° turn in intermittent manner.

THOMAS BLAIR HAWKES.